United States Patent [19]
Nisley

[11] Patent Number: 5,897,214
[45] Date of Patent: Apr. 27, 1999

[54] METHOD AND APPARATUS FOR SECURING A ROTARY MEMBER TO A STATIONARY SHAFT

[75] Inventor: Donald L. Nisley, Greenville, S.C.

[73] Assignee: Reliance Electric Industrial Company, Cleveland, Ohio

[21] Appl. No.: 08/924,435

[22] Filed: Aug. 27, 1997

[51] Int. Cl.[6] .................................................. F16C 43/00
[52] U.S. Cl. ........................... 384/537; 384/538; 384/543
[58] Field of Search ............................... 474/903; 492/16; 193/37; 384/538, 537, 546, 543

[56] References Cited

U.S. PATENT DOCUMENTS

| | | | |
|---|---|---|---|
| 851,419 | 4/1907 | Hess | 384/538 |
| 1,381,178 | 6/1921 | Fjellman | 384/546 |
| 1,893,574 | 1/1933 | Anderson | 384/546 |
| 4,326,793 | 4/1982 | Buholtz | 384/546 |
| 5,011,306 | 4/1991 | Martinie | 384/538 X |
| 5,489,156 | 2/1996 | Martinie | 384/538 |
| 5,685,650 | 11/1997 | Martinie et al. | 384/538 |

OTHER PUBLICATIONS

Article from Hugo Finkenrath OHG, "HFH Conveyor Durms", pages and date unknown.
Article from Reliance Electric—Dodge Division, "Conveyor Components Selection Guide", pp. 1–40, Greenville, SC. 1995.

Primary Examiner—Thomas R. Hannon
Attorney, Agent, or Firm—Patrick S. Yoder; John J. Horn; John M. Miller

[57] ABSTRACT

A structure for mounting a rotating machine element, such as a drum pulley, idler, roller or the like includes first and second bearing sets secured to first and second end disks of the rotating member. The first bearing set is secured to a stationary shaft by means of a locking assembly. The locking assembly includes a wedge-shaped sleeve or adapter which is secured between the inner race of the first bearing set and the stationary shaft. During installation of the locking assembly, the second bearing set remains slidable along the shaft, thereby avoiding pre-loads or stresses in either bearing assembly or the components of the rotating member. Once the rotating member has been fixed in a desired position along the shaft by means of the locking assembly, a retaining element may be placed adjacent to the second bearing set. The structure may be easily disassembled by the reverse process.

20 Claims, 4 Drawing Sheets

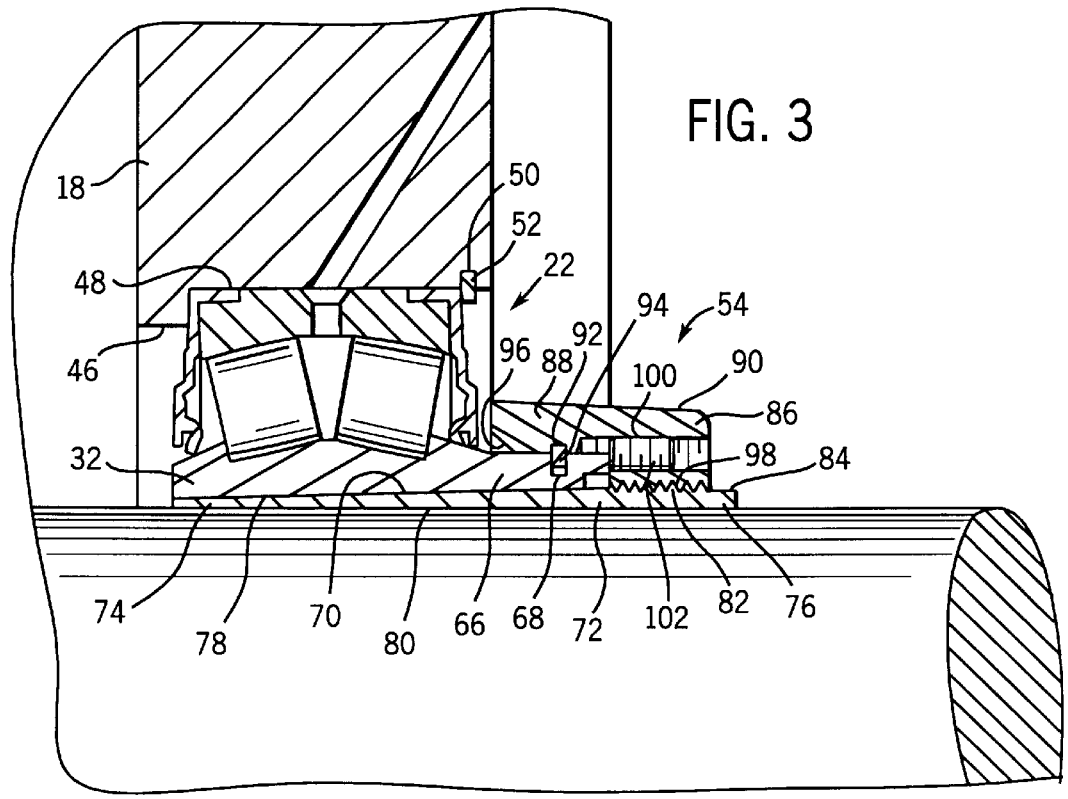
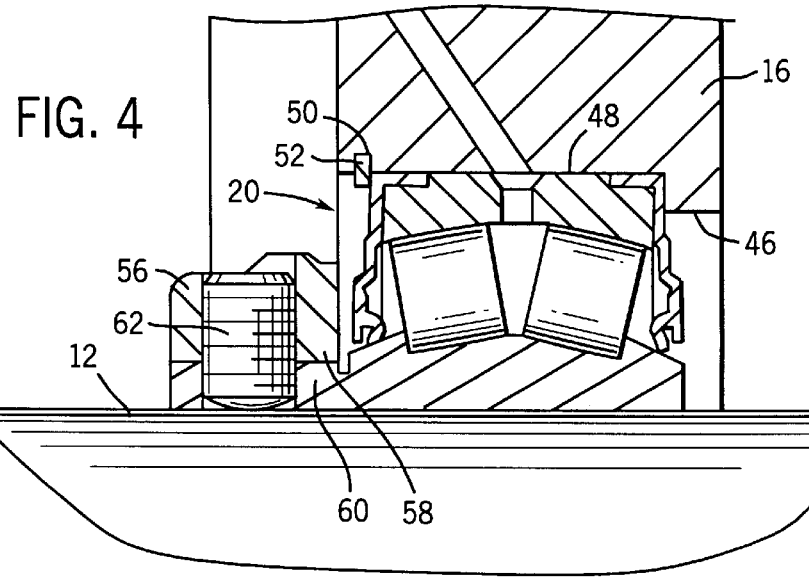

METHOD AND APPARATUS FOR SECURING A ROTARY MEMBER TO A STATIONARY SHAFT

BACKGROUND OF THE INVENTION

1. Field of the Invention

The present invention relates generally to a method and apparatus for mounting a rotary machine element, such as a drum pulley to a stationary shaft. More particularly, the invention relates to a novel technique permitting a pulley or similar element to be accurately positioned in a desired location along a stationary shaft and secured in the desired location without placing excessive and undesirable pre-loading on bearings supporting the pulley.

2. Description of the Related Art

Many applications exist in industrial, mining and other fields for pulleys mounted on stationary shafts. In many such applications, pulley wheels and idlers are mounted on machine frames, and belts, chains or other conveyor means are fed around the pulleys and idlers for moving raw and manufactured materials. In many conveyor systems of this type, drum pulleys are provided which offer excellent support for conveyor belts and contribute to maintaining proper alignment of the conveyor belts on the system components.

Many conveyor applications utilize several types of pulleys and idlers along an extended machine frame over which the conveyor belt runs. Certain of the pulleys may be provided on a "live" shaft. Such pulleys are generally fixed to the shaft and rotate with the shaft as the conveyor is driven. The shaft is, in turn, mounted on anti-friction bearings on the machine frame to permit free rotation of the shaft and pulley. Live shafts of this type are typically used to drive a conveyor belt or chain in the conveyor system. Other pulleys in the conveyor system may be mounted on "dead" shafts. Pulleys of this type will typically be mounted on a pair of bearing sets which are fixed at predetermined locations along the shaft. The shaft is then mounted by means of support blocks which prevent rotation of the shaft. The pulley rotates with respect to the shaft and machine frame, supported by the bearing sets, as the conveyor belt is drawn across it. Both live and dead shaft pulleys of this type are well known in the art and are commercially available from the Dodge Division of Reliance Electric Industrial Company.

Pulleys, idlers and other rotating drum-type elements configured for mounting on dead shafts generally include a central drum-like portion for supporting a belt or web, and end disks secured to the central portion. The end disks may be configured as annular disk-like elements or may includes spokes or recesses depending upon the weight and strength requirements of the application. The end disks are typically welded to the central portion to form a unitary structure.

Several arrangements and methods are known for attaching such rotary elements to dead shafts. In one known arrangement, a hub is precision machined along an interior annular surface and a bearing set is interference fit within the hub. The hub and bearing assembly are then fitted around the dead shaft and secured to the dead shaft to solidly fix the inner race of the bearing set to the dead shaft. An annular outer flange of the hub is then secured by means of bolts to a mating arrangement formed in the end disk of the pulley. In another known arrangement, regions of the dead shaft intended to receive the bearing sets are precision ground and the bearing sets are press fit into locations along the regions. In both arrangements, a first end of the dead shaft is relatively freely attached to the hub or bearing sets. However, as a hub or bearing set is secured to the second end disk of the pulley, the bearing sets are pre-loaded at one or both ends, resulting in undesirable stresses on the bearing elements and end disk attachment joints. Such pre-loading stresses can severely limit the useful life of the bearings and other system components.

In addition to undesirable pre-loading, known structures for mounting rotating members on dead shafts can be extremely difficult to disassemble for servicing of the bearings, shaft or rotating member. In particular, over time, components of the rotating machinery wear, or may fail, requiring removal of one or both bearing sets supporting the rotating member. However, in arrangements having bearing rings press fit to a dead shaft, disassembly requires that the rings be forceably drawn from the shaft, which may prove impossible without destroying the bearing or shaft, or both. Similarly, taper locking arrangements also are difficult to disassemble, requiring that a tapered locking sleeve be drawn from a mating hub.

There is a need, therefore, for an improved technique for mounting a pulley assembly or similar structure to a dead shaft, which avoids or reduces undesirable pre-loading of the support bearing sets between the pulley and the dead shaft. In particular, there is a need for an improved mounting system for dead shaft pulleys in which the pulley can be mounted at a desired position along the shaft and secured in place in a relatively straightforward manner. There is also a need for a dead shaft pulley mounting structure which is easy to assemble and disassemble for servicing of the pulley system components.

SUMMARY OF THE INVENTION

The invention provides a novel technique for mounting a pulley, roller, idler or the like on a fixed shaft, designed to respond to these needs. The arrangement may be employed with new dead shaft installations or may be retrofitted to dead shafts already in service. Moreover, the technique permits the pulley assembly to be accurately located in the desired position along the dead shaft, secured in place in the desired position, and bearings fixed in corresponding positions without exerting undue pre-loading on the bearing assemblies. The arrangement is of a straightforward construction which is simple to install and which can be readily disassembled for servicing of the pulley system. The system does not require special precision machining of either the pulley assembly end disks or precision grinding of the dead shaft bearing support regions, thereby facilitating manufacturing and reducing the overall cost of the assembly.

Thus, in accordance with the first aspect of the invention, a system is provided for mounting a rotary member, such as a pulley, to a stationary shaft. The rotary member includes first and second spaced apart and generally annular supports. The rotary member includes a central portion extending between the annular supports. First and second bearing assemblies are coupled to the first and second supports, respectively, for rotatably supporting the member on the shaft. The system includes a locking assembly and a retainer, such as a collar and set screws. The locking assembly interfaces the first bearing assembly with the shaft. The locking assembly includes a wedge-shaped sleeve disposed between the first bearing assembly and the shaft for securing the first support in a first desired position along the shaft. Means are included in the assembly for retaining the wedge-shaped sleeve in contact with the first bearing assembly and the shaft. The retainer is disposed axially adjacent to the second bearing assembly to maintain the second support in a second desired position along the shaft. In a particularly preferred configuration, the retaining means includes a threaded region formed on the sleeve and a threaded member received on the threaded region. An interface member is provided for coupling the threaded member to a portion of the first bearing assembly.

In accordance with another aspect of the invention, a system is provided for securing a rotary member to a stationary shaft. The system includes a first bearing assembly which is coupled to a first support of the rotary member for supporting the first support in rotation. A locking assembly is provided for securing the first bearing assembly in a first desired position along the shaft. The locking assembly includes a wedge-shaped adapter disposed between the first bearing assembly and the shaft. Means are included for retaining the wedge-shaped adapter in contact with the first bearing assembly and the shaft. A second bearing assembly is coupled to a second support of the rotary member and contacts the shaft for supporting the second support in rotation on the shaft. In a preferred configuration, a retainer is disposed about the shaft axially adjacent to the second bearing assembly for maintaining the second bearing assembly in the second desired position.

The invention also provides a method for securing a rotary member to a stationary shaft. The rotary member includes first and second spaced apart, generally annular supports and a central portion extending therebetween. The first and second supports are held in rotation by first and second bearing assemblies. The method includes a first step of installing a locking assembly to secure the first bearing assembly in a first desired position along the shaft. The locking assembly includes a wedge-shaped adapter disposed between the first bearing assembly and shaft. Means are provided for retaining the wedge-shaped adapter in contact with the first bearing assembly and the shaft. The second bearing assembly is then positioned in a second desired position along the shaft. The second bearing assembly contacts the shaft in the second desired position. A retainer is secured axially adjacent to the second bearing assembly to retain the second bearing assembly in the second desired location. The method permits the rotary member to be accurately positioned in a desired position along the shaft without applying undesirable pre-loads to either the first or second bearing assembly.

BRIEF DESCRIPTION OF THE DRAWINGS

The foregoing and other advantages of the invention will become apparent upon reading the following detailed description and upon reference to the drawings in which:

FIG. 3 is a detailed view of a region of the attachment structure illustrated in FIG. 2 illustrating a preferred arrangement for mounting a first of the support bearings between an end disk of the pulley and the stationary shaft;

FIG. 4 is a detailed view of a region of the attachment structure illustrated in FIG. 2 illustrating a preferred arrangement for mounting a second of the support bearings between end disk of the pulley and the stationary shaft;

DETAILED DESCRIPTION OF SPECIFIC EMBODIMENTS

Figure 1:
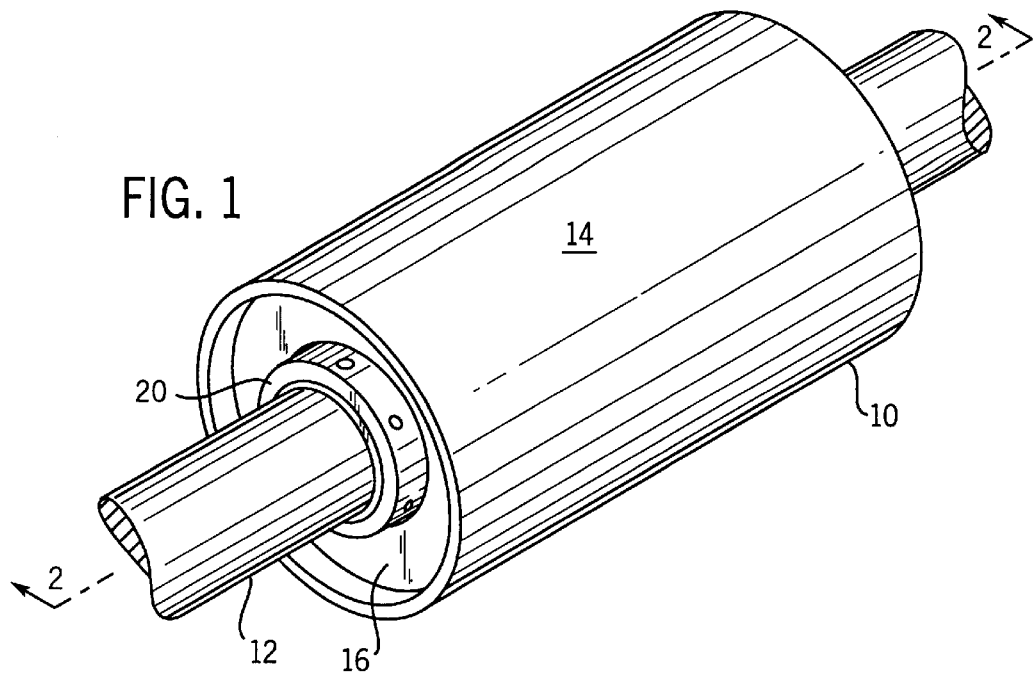
FIG. 1 is a perspective view of a drum pulley secured to a stationary shaft in a manner provided by the invention.

Turning now to the drawings, and referring first to FIG. 1, a rotating element in the form of a pulley 10 is illustrated as supported on a fixed shaft 12. Pulley 10 includes a central portion 14 supported on end disks 16 and 18 (see FIG. 2). Bearing sets 20 and 22 are disposed between end disks 16 and 18, respectively, for supporting pulley 10 in rotation of shaft 12. Bearing sets 20 and 22 are mounted along support regions 24 and 26, respectively along shaft 12. Bearing sets 20 and 22 are secured to shaft 12 as described below. In a typical application, shaft 12 will be mounted and fixed to a machine support frame by means of support blocks (not represented) and a conveyor belt, web, chain or other device may be fed around pulley 10 for support. In certain applications, pulley 10 may contact raw or finished materials directly for particular material handling or conveying purposes. It should be noted that, while throughout the present description reference is made to a pulley 10, the technique set forth herein and recited in the appended claims is not intended to be limited to the mounting of drum pulleys or any particular form of rotary member. Thus, the technique may be applied for securing idlers, rollers and similar rotating elements along a central fixed shaft or along end portions of shaft-like supports.

Figure 2:
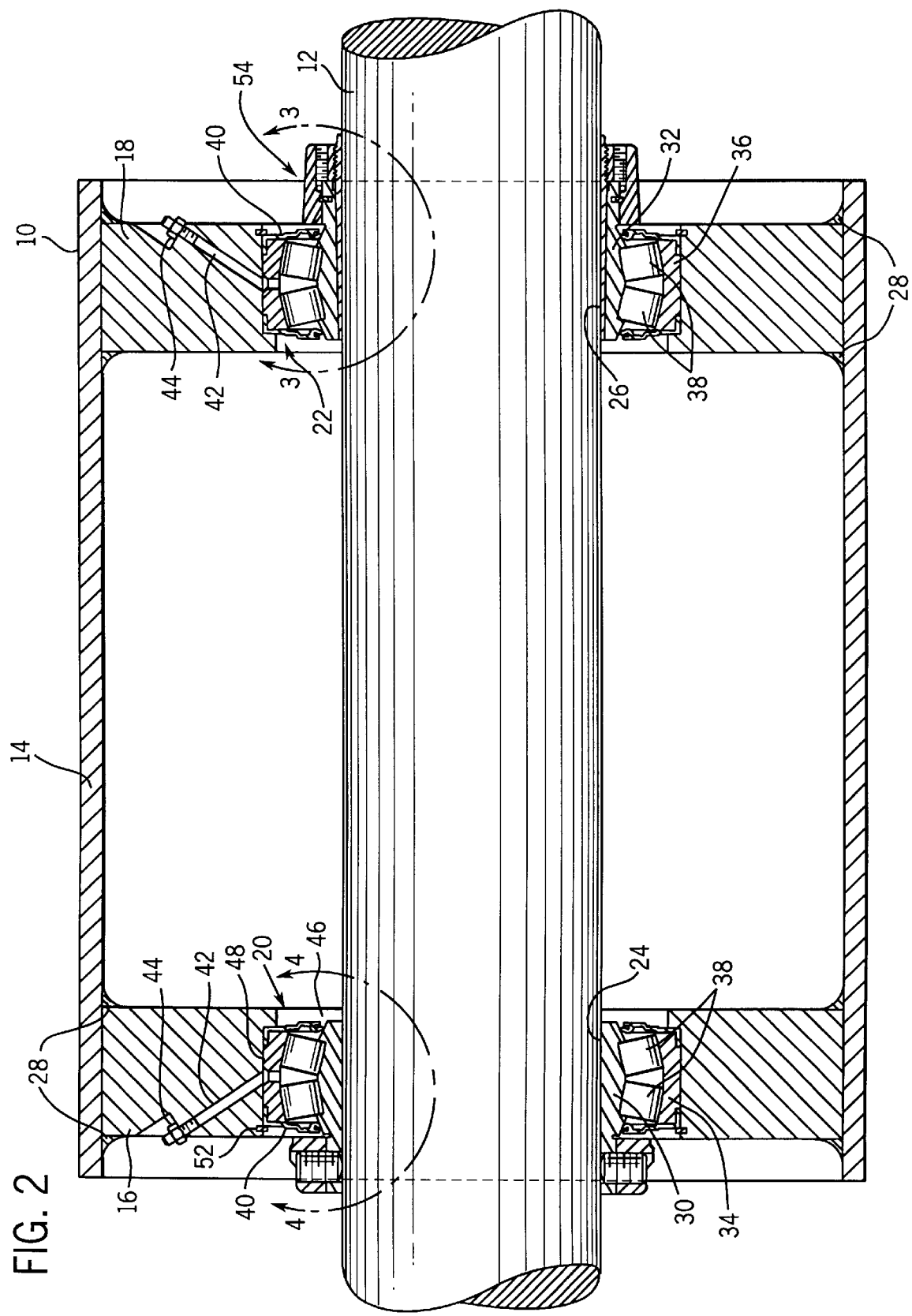
FIG. 2 is a sectional view of the arrangement illustrated in FIG. 1 along line 2—2 illustrating a first preferred arrangement of bearings and attachment structures for the bearings in accordance with the invention.

As best illustrated in FIG. 2, center portion 14 of pulley 10 is mounted on and supported by end disks 16 and 18. Weldments 28 are formed between disks 16 and 18 for solidly securing central portion 14 thereto and for forming a unitary structure. End disks 16 and 18 may be solid, annular, disk-like members, or may include reliefs, spokes and the like to reduce their mass, in a manner well known in the art. Bearing assemblies 20 and 22 include inner rings or races 30 and 32, respectively, and outer rings or races 34 and 36, respectively. Bearing elements 38 are interposed between the inner and outer races, and support the outer races in rotation about the inner races. Moreover, each bearing set may include inboard and/or outboard seals 40 to permit lubricant to be retained within the bearing sets and to prevent the ingress of dirt, debris and other contaminants into the bearing sets. In the preferred embodiment illustrated in the Figures, end disks 16 and 18 each include a lubricant passage 42 capped by a lubricant fitting 44. Bearing sets 20 and 22 may thus be lubricated during service by injecting lubricant grease through passages 42 via lubricant fittings 44.

Each end disk 16 and 18 is formed with an annular bore or pilot surface 46. A bearing support recess 48 is formed within each bore 46 for contacting and receiving outer rings 30 and 32 of bearing sets 20 and 22. In the presently preferred embodiment illustrated, bearing sets 20 and 22 are pressed into recesses 48 in a slight interference fit. As illustrated in the Figures, a groove 50 is formed near an outboard end near disks 16 and 18, and a retaining ring, such as a snap ring, is inserted into grooves 50 to maintain bearings 20 and 22 within recesses 48 (see FIGS. 3 and 4). Alternatively, end disks 16 and 18 may be formed as flange-type annular disks and bearing sets 20 and 22 may include mating peripheral flanges designed for attachment to disks 16 and 18 by bolts or the like.

To permit pulley 10 to be secured to shaft 12 without undesirable pre-loading or stressing of elements of bearing assemblies 20 and 22, each bearing assembly is secured to shaft 12 as follows. Bearing assembly 22 is secured to shaft 12 by means of a locking assembly 54 as described in greater detail below. Bearing assembly 20, on the other hand, is slideably received on shaft 12 and maintained in position on shaft 12 by means of a non-compression collar 56 and set screws 62. These structures are illustrated in greater detail in FIGS. 3 and 4. As illustrated in FIG. 4, collar 56 is designed to be positioned adjacent to bearing assembly 20 and includes an inner annular face region 58. Inner ring 30 of bearing assembly 20 includes a corresponding outer annular extension 60 which, when assembled with shaft 12 and collar 56, lies radially beneath region 58. Set screws 62 are provided through collar 56 and extension 60 to lock bearing assembly 20 in a predetermined position along shaft 12. Collar 56 may be preassembled about extension 60 by inserting set screws 62 loosely through both members as discussed below.

Referring to FIG. 3, locking assembly 54 interfaces with specially adapted structures on inner ring 32 of bearing assembly 22 to fix assembly 22, end disk 18 and thereby, pulley 10 in a desired position along shaft 12. Inner ring 32 of bearing assembly 22 includes an annular extension 66 in which an outer annular groove 68 is formed. Inner ring 32 further includes a radially internal tapered surface 70 extending along its length from extension 66 to an area below end disk 18.

Locking assembly 54 further includes a wedge-shaped adapter or sleeve 72 disposed between inner ring 32 and shaft 12. An axially inner end 74 of sleeve 72 is positioned radially inwardly of end disk 18, while an axially outer end 76 of sleeve 72 is positioned at an outboard location as shown in FIG. 3. Sleeve 72 has a tapered radially external surface 78 configured to bear against internal surface 70 of ring 32. Moreover, sleeve 72 has a generally cylindrical radially interior 80 configured to contact and bear against shaft 12. As will be appreciated by those skilled in the art, sleeve 72 preferably includes one or more longitudinal slots (not represented) extending from end 74 toward end 76 for allowing sleeve 72 to be compressed slightly during mounting as described below. Sleeve 72 further includes an externally threaded portion 82 along outer end 76. A relief 84 is formed outboard of threaded portion 82.

Locking assembly 54 also includes a nut 86 adapted to draw sleeve 72 solidly into engagement beneath bearing assembly 22. Nut 86 includes a retaining extension 88 extending in a direction toward bearing assembly 22, and a threaded portion 90 outboard of extension 88. A radially inwardly-facing groove 92 is formed in retaining extension 88 as illustrated in FIG. 3. A retaining element, preferably in the form of compressible metallic retaining ring 94 is disposed in groove 92 and in corresponding groove 68 of inner ring 32 to maintain the grooves in mutually-facing relation and thereby to lock nut 86 rotatably on inner ring 32. To facilitate assembly of locking assembly 54, nut 86 includes a compression taper 96 at a distal end of retaining extension 88. For assembly, ring 94 is placed within groove 68 of inner ring 32, and nut 86 is pressed into place over extension 66. Taper 96 thereby compresses ring 94 into groove 68 until grooves 68 and 92 come into mutually-facing position. Ring 94 then expands into groove 92, locking nut 86 rotatably in place on extension 66.

Nut 86 also includes an internally threaded portion 98 configured to contact and interface with threaded portion 82 of sleeve 72. A threaded bore 100 is formed in threaded portion 90 of nut 86, and a set screw 102 is positioned therein. Bore 100 is positioned such that set screw 102 contacts an axially outboard end of extension 66 when locking assembly 54 is fully assembled as described below.

Locking assembly 54 is assembled and locked in position between bearing assembly 22 and shaft 12 as follows. Nut 86 is first assembled on inner ring 32 of bearing assembly 22 as described above, thereby rotatably locking nut 86 in place on ring 32. Sleeve 72 is then inserted between nut 86 and shaft 12, and fed between bearing assembly 22 and shaft 12 until external threaded portion 82 of sleeve 72 and internal threaded portion 98 of nut 86 come into engagement. Nut 86 is then rotated on inner ring 32 to engage the threads of portions 82 and 98 with one another, drawing sleeve 72 further into engagement between inner ring 32 and shaft 12. By progressive rotation of nut 86, sleeve 72 is pressed into tight engagement between bearing assembly 22 and shaft 12, locking these two elements firmly to one another. To prevent nut 86 from rotating in a counter direction and thus permitting sleeve 72 to be withdrawn from engagement, set screw 102 is locked into engagement against extension 66 of inner ring 32.

Figure 5:
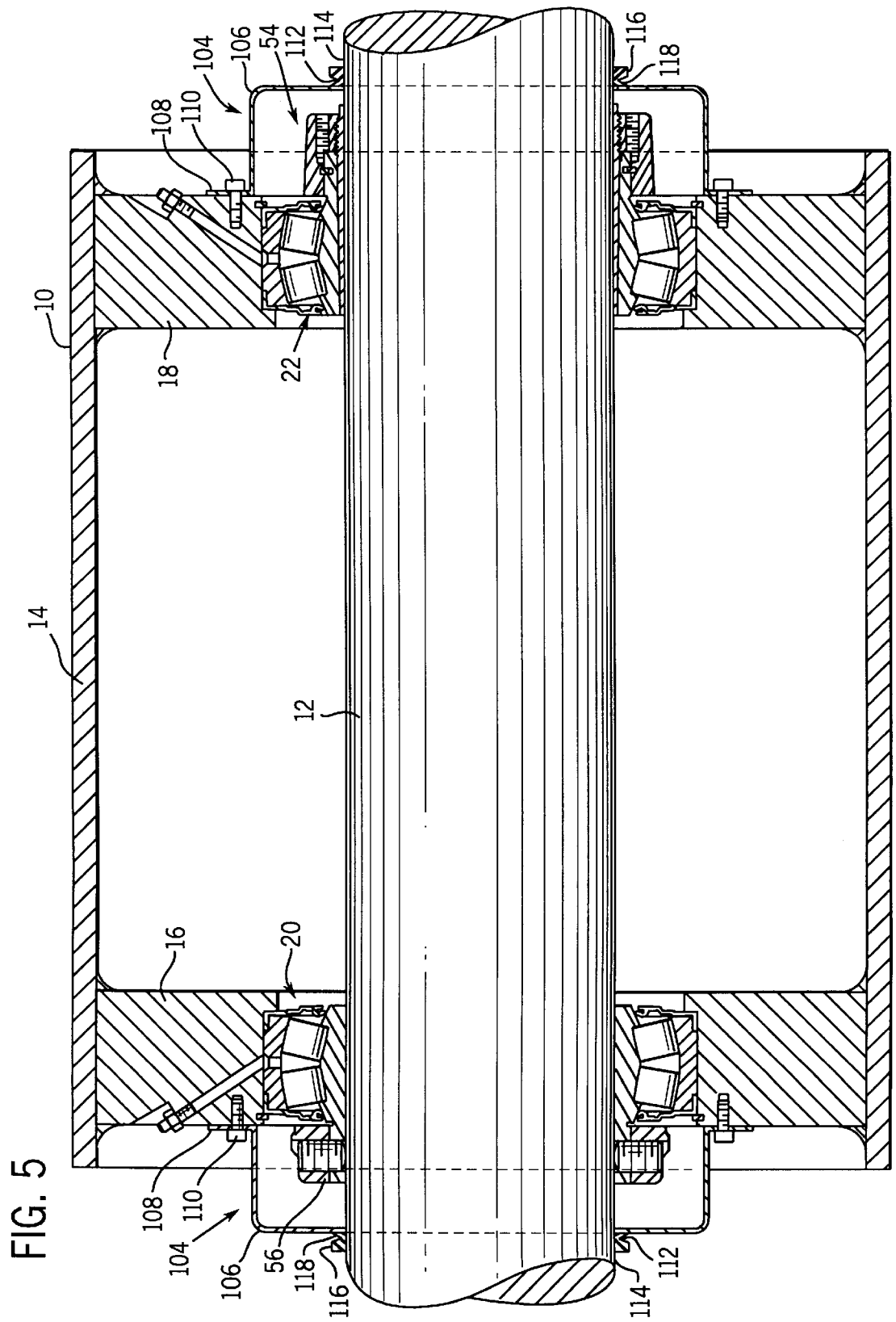
FIG. 5 is a sectional view of an alternative configuration of the pulley mounting structure illustrated in FIG. 2, including protective structures outboard of the bearing and attachment structures.

FIG. 5 illustrates an alternative or variant of the structures described above which includes a protective cover over collar 56 and locking assembly 54. Thus, as illustrated in FIG. 5, an auxiliary seal or protective arrangement 104 may be secured over each bearing assembly. Auxiliary seal arrangements 104 each include an annular shield 106 having a radially outwardly projecting flange 108. Each shield 106 is secured to an end disk by fasteners 110 received through flanges 108 and into corresponding threaded bores formed in the end disks. A face-rubbing seal 112 is secured around the outboard external surface 114 of shaft 12. Seal 112 is preferably a V-ring seal including a back-up portion 116 and a lip portion 118. Once shields 106 are secured to end disks 16 and 18, seals 112 are slid tightly around shaft 12 and pressed into positions adjacent to shields 106, such that lips 118 ride against the shields. Alternatively, back-up collars or the like may be provided outboard of seals 112, or seals 112 may be supported on such collars so as to be securely maintained in position against shields 106. Auxiliary seal arrangements 104 offer additional protection to bearing assemblies 20 and 22 and their corresponding mounting structures.

Figure 6:
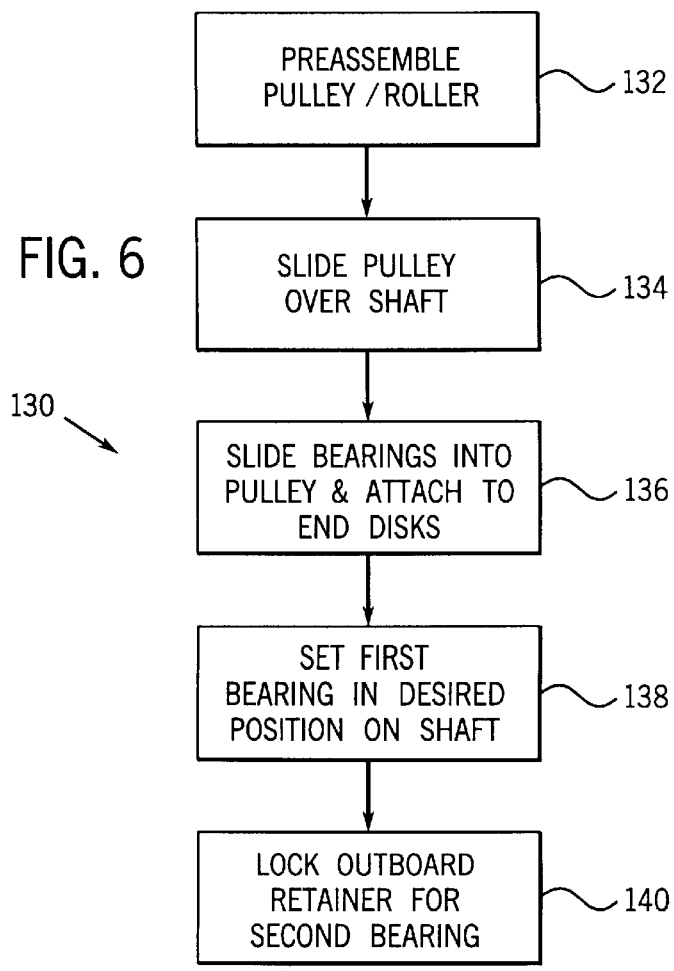
FIG. 6 is a flow chart illustrating exemplary steps for securing the bearing assemblies to the stationary shaft.

The structures described above permit pulley 10 to be secured to shaft 12 in a desired location along shaft 12, without imparting undue stresses or pre-loads to either bearing assembly or to end disks associated with pulley 10. Sequential steps for assembling the structure in accordance with a presently preferred embodiment are represented diagrammatically in FIG. 6. The method, designated generally by reference numeral 130, summarized in FIG. 6 proceeds as follows. As indicated at step 132, the pulley or roller 10 is preferably pre-assembled by securing (e.g. welding) end disks 16 and 18 to central portion 14. The assembled pulley is then slid over shaft 12, as indicated at step 134. This is done by inserting shaft 12 through annular bores 46 formed in the end disks. As indicated at step 136, bearing assemblies 20 and 22 are next slid into position along shaft 12 and attached to end disks 16 and 18. As noted above, the bearing assemblies are preferably slideable along shaft 12 so as to be freely positionable. Moreover, in the illustrated embodiment bearing assemblies 20 and 22 are interference fit within recesses 48. As mentioned above, various alternative configurations can be envisioned by those skilled in the art, including flange-type structures for securing appropriately configured disks 16 and 18 to flanged bearing housings. With the bearings thus fixed to the end disks, bearing set 22 is next secured in its desired position along shaft 12 as indicated at step 138. This operation is performed as summarized above in the detailed description of the structure and function of locking assembly 54. It should be noted that as locking assembly 54 is assembled to solidly attach bearing assembly 22 in its desired position about shaft 12, bearing assembly 20 remains free to slide along shaft 12, thereby avoiding pre-loading of either bearing assembly 22 or bearing assembly 20. Any movement of bearing 22 and corresponding movement of pulley 10 during installation of locking assembly 54 will thus define the desired position of bearing assembly 22 in the final structure. Prior to mounting of bearing assembly 20 on shaft 12, collar 56 is preferably loosely mounted about extension 60 of inner ring by fitting set screws 62 in aligned bores of both members. Subsequently, once bearing assembly 22 is solidly locked in position on shaft 12, set screws 62 may be tightened within collar 56 to lock collar 56 and bearing assembly 20 in position, as indicated at step 140. Finally, any outboard protective structures or auxiliary seals may be installed as illustrated in FIG. 5.

It should be noted that by virtue of the foregoing method the structure described above can be installed in a relatively straightforward manner to secure the rotating member to the stationary shaft. For subsequent servicing of the bearing sets, the shaft or the components of the rotating member, the structure can be disassembled by following the steps illustrated in FIG. 6 in reverse order. In particular, once installed on extension 66 of inner ring 32, nut 86 is secured axially by ring 94. By rotating nut 86 in a direction opposite to that used to lock sleeve 72 in place, sleeve 72 may be withdrawn from its installed position between bearing assembly 22 and shaft 12 for disassembly of the structure in an efficient and controlled manner. Set screws 62 held by collar 56 may then be loosened to free the entire structure from shaft 12. Following servicing, sleeve 72 may be replaced into its locking position and set screws 62 tightened about shaft 12 as described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for securing a rotary member to a stationary shaft, the rotary member including first and second spaced apart and generally annular supports, a central portion extending between the annular supports, and first and second bearing assemblies coupled to the first and second supports, respectively, for rotatably supporting the rotary member on the shaft, the system comprising:
    a compression locking assembly interfacing the first bearing assembly with the shaft, the locking assembly including a wedge-shaped sleeve disposed between the first bearing assembly and the shaft for securing the first support in a first desired position along the shaft, and means for retaining the wedge-shaped sleeve in the desired position between first bearing assembly and the shaft; and
    a non-compression retainer axially adjacent to the second bearing assembly for maintaining the second bearing assembly in a second desired position along the shaft.

2. The system of claim 1, wherein the means for retaining the wedge-shaped sleeve includes a threaded region formed on the sleeve, a threaded member received on the threaded region, and an interface member for coupling the threaded member to a portion of the first bearing assembly.

3. The system of claim 2, wherein the interface member is received in mutually facing recesses in the threaded member and an inner ring of the first bearing assembly.

4. The system of claim 3, wherein the mutually facing recesses are annular grooves.

5. The system of claim 1, wherein the first bearing assembly includes an inner ring having a tapered radially internal surface, and wherein the wedge-shaped sleeve includes a tapered radially external surface configured to bear against the tapered radially internal surface of the inner ring.

6. The system of claim 1, wherein the retainer includes a collar configured to contact the shaft and to bear against the second bearing assembly.

7. The system of claim 6, wherein the collar includes at least one locking member, the locking member contacting the shaft to maintain the second support in the second desired position.

8. A system for securing a rotary member to a stationary shaft, the rotary member including first and second spaced apart, generally annular supports and a central portion extending between the annular supports, the system comprising:
    a first bearing assembly coupled to the first support for supporting the first support in rotation;
    a locking assembly for securing the first bearing assembly in a first desired location along the shaft, the locking assembly including a wedge-shaped adapter disposed between the first bearing assembly and the shaft, and means for retaining the wedge-shaped adapter in contact with the first bearing assembly and the shaft; and
    a second bearing assembly coupled to the second support and contacting the shaft for supporting the second support in rotation on the shaft, the second bearing assembly being prevented from slidable movement along the shaft by a non-compression retainer.

9. The system of claim 8, further comprising a retainer disposed about the shaft and axially adjacent to the second bearing assembly, the retainer contacting the second bearing assembly to maintain the second bearing assembly in a second desired location along the shaft.

10. The system of claim 9, wherein the retainer includes a collar configured to contact the shaft and to bear against the second bearing assembly.

11. The system of claim 10, wherein the collar includes at least one locking member, the locking member contacting the shaft to maintain the second support in the second desired location.

12. The system of claim 8, wherein the second bearing assembly includes an inner race having a substantially cylindrical radially interior surface in direct contact with the shaft.

13. A method for securing a rotary member to a stationary shaft, the rotary member including first and second spaced apart, generally annular supports and a central portion extending therebetween, the first and second supports being held in rotation by first and second bearing assemblies, respectively, the method comprising the steps of:
    (a) installing a locking assembly to secure the first bearing assembly in a first desired position along the shaft, the locking assembly including a wedge-shaped adapter disposed between the first bearing assembly and the shaft, and means for retaining the wedge-shaped adapter in the desired position between the first bearing assembly and the shaft;

(b) positioning a second bearing assembly in a second desired position along the shaft, the second bearing assembly contacting the shaft in the second desired position; and (c) securing a non-compression retainer axially adjacent to the second bearing assembly to retain the second bearing assembly in the second desired position.

14. The method of claim 13, comprising the further step of securing the first and second bearing assemblies to the first and second supports, respectively, prior to steps (b) and (c).

15. The method of claim 14, wherein the first and second supports each include a bearing interface recess, and wherein the first and second bearing assemblies are secured to the first and second supports by interference fitting each bearing assembly into a respective interface recess.

16. The method of claim 13, wherein the second bearing assembly is slidable along the shaft.

17. The method of claim 16, wherein installation of the locking assembly in step (a) determines the second desired position of the second bearing assembly.

18. The method of claim 17, wherein the means for retaining the wedge-shaped adapter includes a threaded region formed on the adapter, a threaded member received on the threaded region, and an interface member for coupling the threaded member to a portion of the first bearing assembly.

19. The method of claim 18, wherein in the interface member is received in mutually facing recesses in the threaded member and an inner ring of the first bearing assembly.

20. The method of claim 19, wherein the mutually facing recesses are annular grooves.

* * * * *